June 30, 1964 P. E. MARION 3,139,510
METHOD OF REBUILDING TOOL JOINTS
Filed April 14, 1961
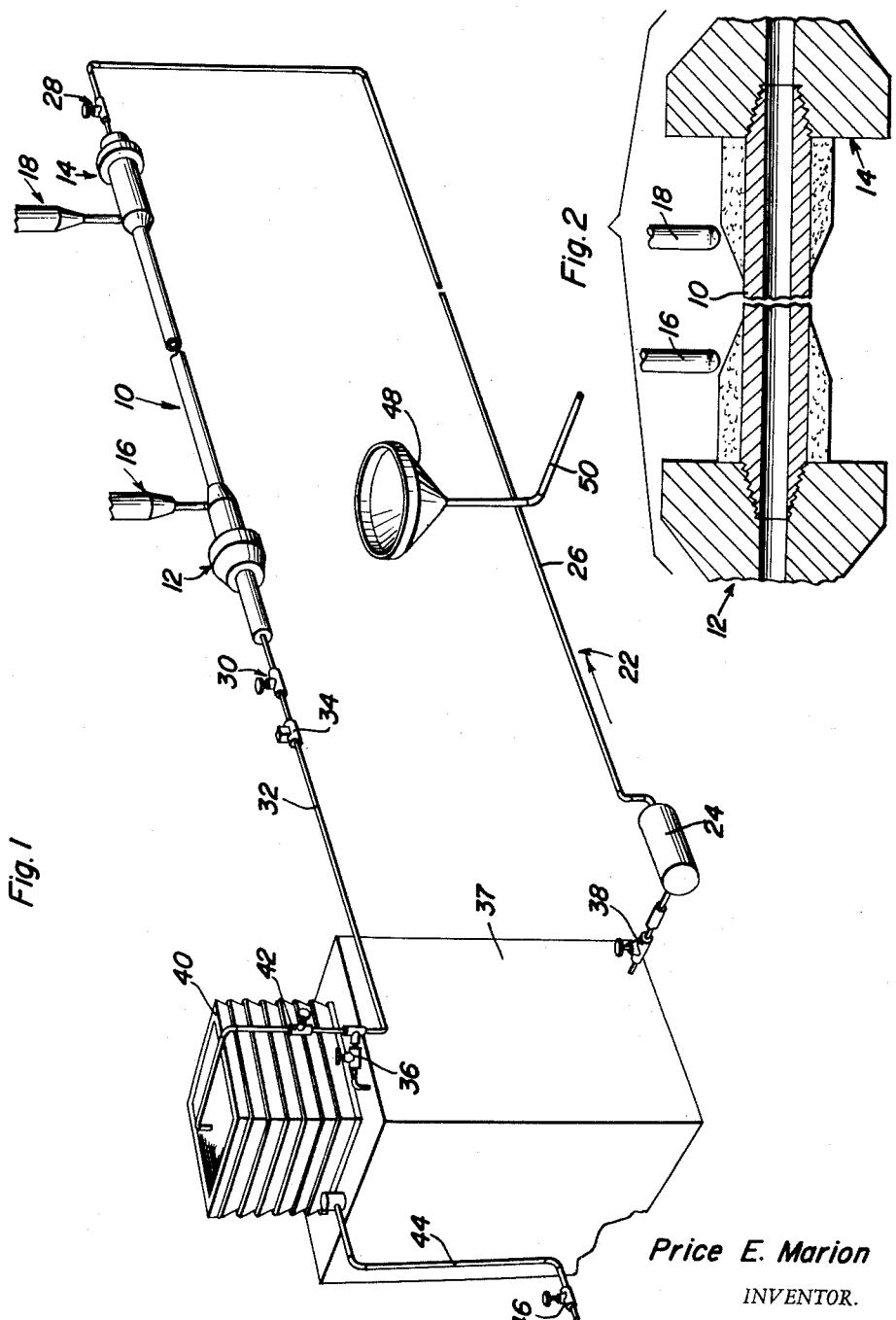
Price E. Marion
INVENTOR.

United States Patent Office 3,139,510
Patented June 30, 1964

3,139,510
METHOD OF REBUILDING TOOL JOINTS
Price E. Marion, Farmington, N. Mex., assignor to Price Marion Tool Joint Rebuilders, Inc. of Wyoming, a corporation of Wyoming
Filed Apr. 14, 1961, Ser. No. 103,134
8 Claims. (Cl. 219—76)

This invention relates to a process for rebuilding worn drill pipe constituting a tool joint in well drilling apparatus.

The drill stem of well drilling apparatus after constant drilling operations becomes worn down because of the abrasive action to which it is subjected by the material within the well as the drill stem rotates relative thereto. Rather than discarding worn down drill pipe forming tool joints in the drill stem, or permitting operation of the drill stem until rupture thereof, the expensive and needless waste may be rectified by the practice of the method of the present invention. Accordingly, tool joints may be repaired by the method of the present invention by rebuilding the outer surfaces thereof at the ends of the tool joint so as to restore the tool joint to its original dimensions.

It is therefore a primary object of the present invention to provide a method for rebuilding drill pipe constituting a tool joint in a drill stem by uniformly coating the outer surfaces thereof from the opposite ends thereof in a uniform manner so as to restore the drill pipe diameter to its original dimensions.

Another object of this invention is to provide a method for rebuilding the worn portions of a tool joint by automatically applying a cold weld thereto with a uniformity and rapidity heretofore not possible.

The foregoing objects may be accomplished without danger of breaking or crystallizing the pipe when the method of the present invention is practiced. Accordingly, another object of the invention is to provide a recirculating coolant system whereby coolant is circulated through the drill pipe while the material is being applied thereto by welding so as to artificially redistribute the heat transferred to the pipe by the material appended thereto at an elevated temperature in order to maintain the temperature throughout the drill pipe at a constant and uniform high value. As a result of this procedure, metal may be appended to the drill pipe automatically and with uniformity not possible by the discriminating use of manually directed welding apparatus. The ends of a tool joint may therefore be rebuilt so as to restore the worn surfaces thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic illustration of the circulatory cooling system by means of which the method of the present invention may be practiced.

FIGURE 2 is a partial sectional view through a drill pipe installed within the circulatory system of FIGURE 1 in the process of being rebuilt.

Referring now to the drawing in detail, it will be observed that a drill pipe section generally referred to by reference numeral 10 is being rebuilt at the joint ends thereof. It will be appreciated by those skilled in the art, that a drilling stem becomes particularly worn at the joint ends of the drill pipe sections because of the abrasive action as hereinbefore mentioned. It will be further appreciated, that the cost of manually restoring the worn portions of drill pipe by welding in accordance with the usual procedures, would be prohibitive because of the time and expense involved. Automatic electrode-arc welding apparatus for uniformly applying metal coatings by deposit of molten metal, have broadly been available but have not been applied to the particular problem with which the present invention is concerned because breakage of the pipe due to crystallization of the material would often occur as a result of the varying temperature gradient produced along the pipe as the welding proceeds along the pipe. However, by maintaining a constant and uniform high temperature throughout the drill pipe during the welding process, the automatic welding apparatus may be applied for drill pipe rebuilding purposes. Accordingly, the drill pipe 10 as illustrated is installed between a pair of chuck devices 12 and 14 to which rotation is imparted at a predetermined speed in relation to a pair of welding heads 16 and 18 which are movable from the opposite ends of the drill pipe 10 toward each other at a predetermined linear rate of speed which is so related to the rotational movement imparted to the pipe 10 as to apply a coating of molten metal that subsequently cools and contracts to form an adhering metallic layer so as to restore the original diameter to a worn portion of the drill pipe 10.

A coolant circulatory system generally referred to by reference numeral 22 is therefore provided in connection with the rotating assembly of drill pipe 10 and chucks 12 and 14 so as to maintain the temperature uniform and constant throughout the drill pipe when heated by the molten metal which descends thereupon from the welding heads 16 and 18 being automatically movable along the drill pipe for applying a uniform coating thereto. This is accomplished because the coolant is effective to redistribute the heat transferred instantaneously to the entire pipe body by the molten metal in a temperature gradient pattern and is also effective thereby to retard reduction in the temperature of the appended metal and the skin of the pipe body. The circulatory system accordingly involves the flow of a coolant medium which may be water for example in one direction. Accordingly, a pump 24 is provided in order to maintain the recirculation of the coolant medium. The discharge of the pump 24 is therefore connected to a conduit 26 for supply of the coolant medium to one end of the drill pipe 10 through the chuck device 14. A control valve 28 is provided in the conduit 26 for the purpose of controlling the inlet flow of coolant through the drill pipe. An outlet control valve 30 may also be provided for controlling the outlet flow of coolant from the drill pipe 10 into a return conduit 32. A further automatic control may be provided if desired by a thermostatically operated control valve 34. The return conduit 32 conducts the coolant medium through a control valve 36 into a coolant tank or heat exchanger 37 from which the coolant medium may be controllably supplied to the inlet of the pump 24 by the control valve 38. A predetermined portion of the return coolant within the conduit 32 may be routed through a coolant tower 40 by control of the valve 42. Also, makeup fluid may be supplied to the tank 37 by conduit 44 through the valve 46. It will therefore be apparent, that the rate of flow of coolant through the tank 37 and the coolant tower 40 may be so controlled in relation to the control of the rate of flow of fluid through the drill pipe by manipulation of the control valves 28 and 30, to maintain the temperature throughout the drill pipe 10 at the desired constant and uniform value. It will be further appreciated, that a certain amount of leakage coolant will escape from the chuck device 12 for which reason a collector 48 is provided which is connected to a waste coolant conduit 50.

From the foregoing description, operation and utility of the present invention will be apparent. The method of the present invention therefore involves the circulation of water or other coolant through a joint of drill pipe which is made part of the coolant circulatory system during the rebuilding of the worn parts of the drill pipe by a cold weld applied to either end of the joint of pipe for the purpose of building up the outside diameter of the pipe joint to the original dimensions. By circulating the coolant through the pipe during the welding process, the application of material to the pipe may be accomplished without breakage or crystallization of the pipe material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of rebuilding a worn tool joint drill pipe, comprising the steps of: applying a coating of predetermined thickness and elevated temperature to the outside surface of a drill pipe section proceeding simultaneously from opposite ends thereof tending to produce a varying temperature gradient along said pipe; and circulating coolant through the drill pipe during the surface coating thereof to simultaneously transfer heat along said pipe section to eliminate said temperature gradient and maintain a constant relatively high temperature along the drill pipe section to prevent crystallization and breakage.

2. The method of claim 1 wherein the step of coating the worn drill pipe section comprises: rotating the drill pipe; and applying metal by welding along the drill pipe at a predetermined linear rate of movement from opposite ends of the drill pipe.

3. The method of claim 1 wherein the step of circulating coolant comprises: pumping the coolant in a continuous path through the drill pipe section and a heat exchanger; and controlling the flow rate of coolant through the drill pipe and heat exchanger for maintaining the temperature of the drill pipe constant therealong during the coating thereof.

4. The method of claim 1, wherein the coating is applied to a thickness predetermined so as to restore a worn drill pipe section to its original dimension.

5. The method of forming an adhering solid layer of one substance on a metal base of a tubular section which comprises: elevating the temperature of said one substance to render it fluid; progressively depositing said one substance in a fluid state externally about said tubular section causing transfer of heat to the skin of the metal base tending to produce a temperature gradient along the entire body of the tubular section; and passing coolant internally through said tubular section for artificially redistributing said heat transferred to the body of said tubular section to maintain a constant temperature of said one substance along the tubular section while being deposited thereon to prevent crystallization and breakage.

6. In a temperature controlling system, the combination of piping forming a closed path, means for circulating coolant through said path, means for removing heat from the circulated coolant sufficient to produce heat redistribution along a predetermined portion of said path at a reduced heat transfer rate by said coolant flowing in the closed path, and hollow chuck means for connecting with said path, and serving to support a hollow object to be welded by a progressive deposit of molten metal thereon, said hollow object bridging said predetermined portion of said path to receive the redistributing coolant flow.

7. A method of rebuilding a worn tubular section comprising the steps of: applying a coating of predetermined thickness and elevated temperature to the outside surface of said tubular section tending to produce a varying temperature gradient therealong; and passing a flow of coolant through the tubular section during the surface coating thereof for simultaneously transferring heat along said tubular section to decrease said temperature gradient and maintain a constant relatively high temperature along the tubular section in order to prevent crystallization and breakage.

8. The method of claim 7 wherein the step of coating the worn tubular section comprises: rotating the tubular section about an axis in the direction of coolant flow; and depositing molten metal by welding at a predetermined linear rate axially along said axis of the tubular section.

References Cited in the file of this patent

UNITED STATES PATENTS

| | | |
|---|---|---|
| 1,000,412 | Isaacs | Aug. 15, 1911 |
| 1,416,879 | Rousseau | May 23, 1922 |
| 1,801,140 | Chapman | Apr. 14, 1931 |
| 1,838,899 | Arnold | Dec. 29, 1931 |
| 1,924,876 | Morgan | Aug. 29, 1933 |
| 1,952,086 | McKee | Mar. 27, 1934 |
| 1,998,496 | Fiedler | Apr. 23, 1935 |
| 2,299,747 | Harter | Oct. 27, 1942 |
| 2,709,213 | Gibson | May 24, 1955 |
| 2,912,562 | Donovan | Nov. 10, 1959 |
| 2,914,651 | Ackerman | Nov. 24, 1959 |

OTHER REFERENCES

"Rebuilding Integral-Joint Drill Pipe," by Keener et al., published in Drilling (recd. in P.O. Jan. 12, 1944).